April 28, 1953 J. P. HARRINGTON ET AL 2,636,582
CLUTCH FOR BALING MACHINES FOR FARM PRODUCTS
Filed March 18, 1949 5 Sheets-Sheet 1

Inventor
JULIAN P. HARRINGTON.
JOHN D. MITCHELL.

By Munn, Liddy and Glascum
ATTORNEYS

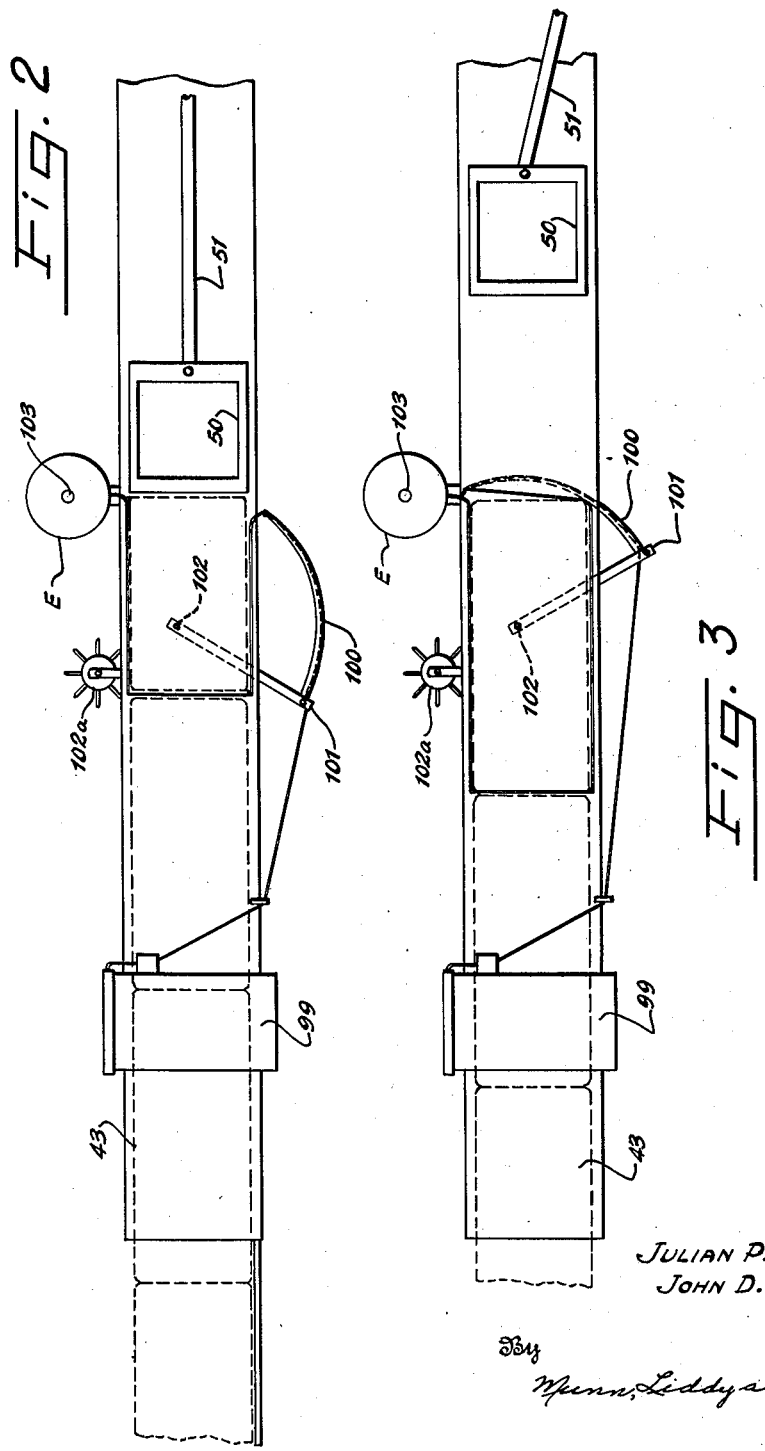

April 28, 1953     J. P. HARRINGTON ET AL     2,636,582
CLUTCH FOR BALING MACHINES FOR FARM PRODUCTS
Filed March 18, 1949     5 Sheets-Sheet 3

Inventor
JULIAN P. HARRINGTON.
JOHN D. MITCHELL.

ATTORNEYS

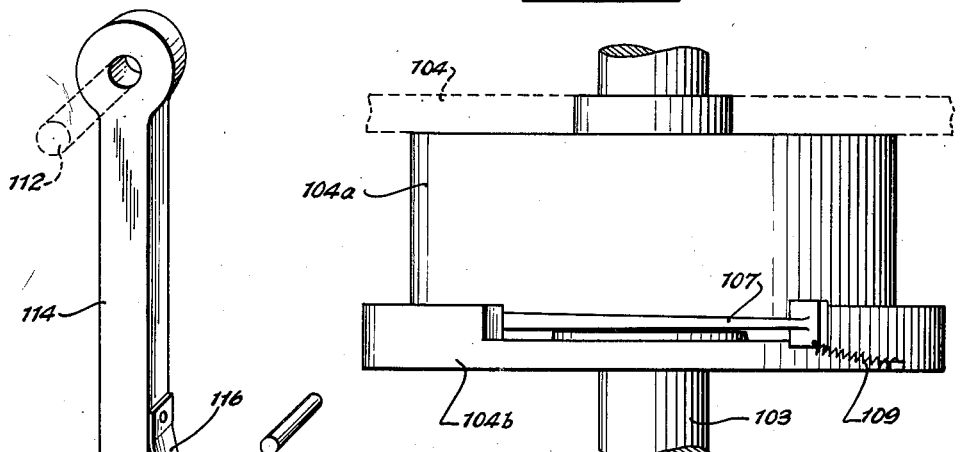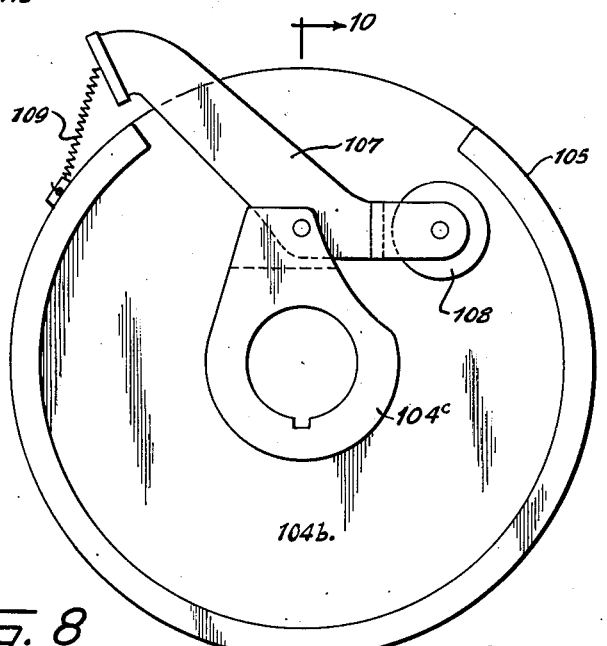

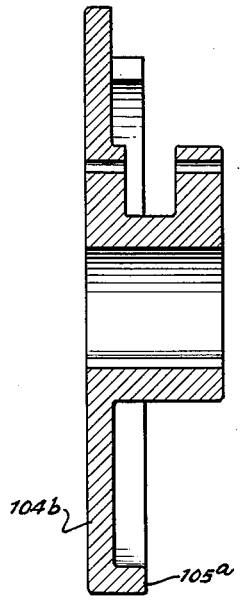
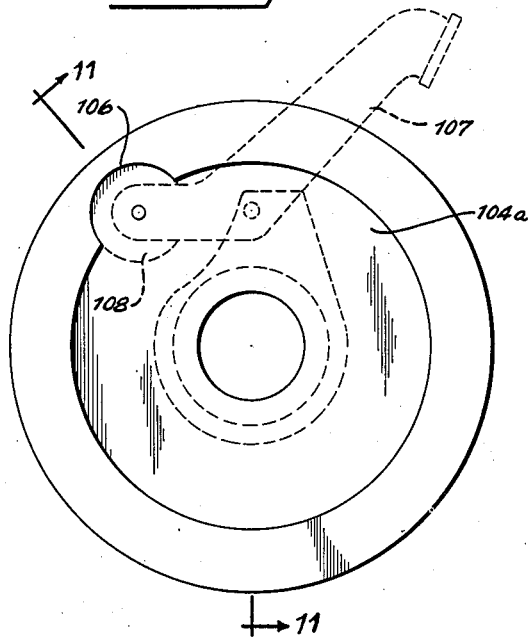
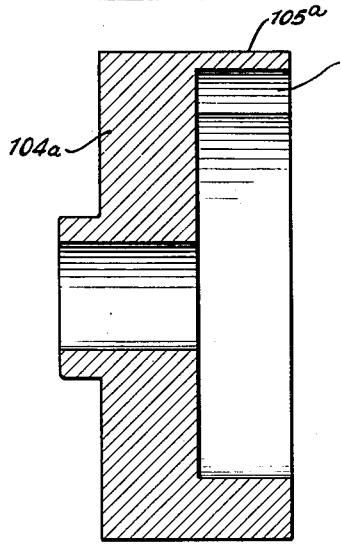
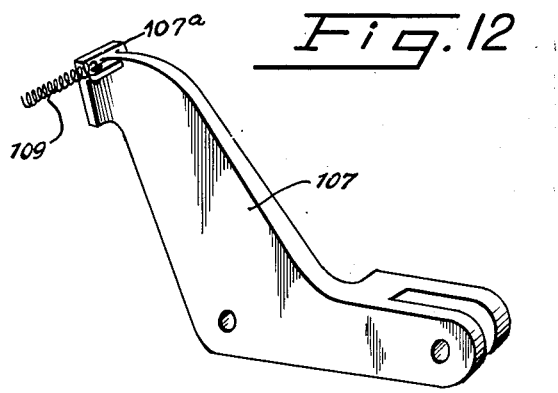
Inventor
JULIAN P. HARRINGTON.
JOHN D. MITCHELL.

Patented Apr. 28, 1953

2,636,582

UNITED STATES PATENT OFFICE 2,636,582

CLUTCH FOR BALING MACHINES FOR FARM PRODUCTS

Julian Picott Harrington, Lewiston, and John D. Mitchell, Woodville, N. C., assignors to Harrington Manufacturing Co., Lewiston, N. C., a partnership Application March 18, 1949, Serial No. 82,172

8 Claims. (Cl. 192—28)

1

The present invention relates to that class of farm implements used exclusively for baling hay and other products of similar growth.

One of the objects of our invention is to provide a machine of this character having a baling chamber in conjunction with a continuously reciprocating packer element and into which given quantities of hay or similar product is swept laterally between reciprocations of the packer until a bale of predetermined size has been formed and thereafter bind or secure the same also between reciprocations of the packer so that there is no lost motion as the machine as a whole is advancing along a windrow.

Another object of this invention is to provide a clutch and operating mechanism therefor for initiating action of bale binding means in proper timed relation to the operation of the other components of the baling machine.

To these and other ends our invention comprises further improvements and advantages as will be further described in the accompanying specification, the novel features thereof being set forth in the appended claims.

In the drawings:

Figures 2 and 3 are diagrammatic views of the baling chamber in side elevation, the first showing a partially completed bale and the second illustrating a completed bale in step of tying the binding twine.

Figure 6 is a perspective view of the kick-off lever and its trigger which implements the clutch arm release member shown in Figs. 4–5 and is actuated upon the completion of a bale of predetermined size.

Figure 7 is an enlarged top plan view of the knotter control clutch.

Figure 8 is a detached view of the inner side of the cover of the clutch shown in Fig. 7 and the locking arm carried thereon.

Figure 9 is a similar view showing the interior of the clutch drum.

Figure 10 is a vertical cross-sectional view taken on the line 10—10 of Fig. 13.

Figure 11 is a similar view taken on the line 11—11 of Fig. 9.

Figure 12 is a perspective view of the locking and release arm of the clutch shown in Figs. 7–8

Figure 4:
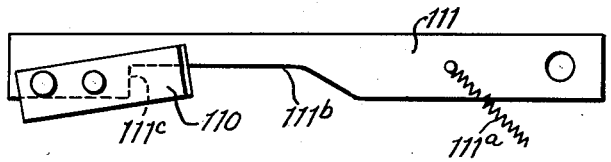
Figures 4 and 5 are side and top plan views respectively of the arm which controls the clutch by means of which the knotters are periodically actuated when the cord feeding needles are in the position in Fig. 7.
Figure 5:
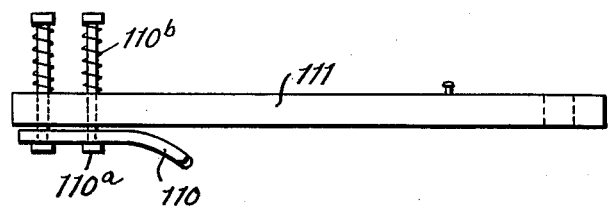

2 which is tripped by the operation of the arm shown in Figs. 4–5.

Figure 13:
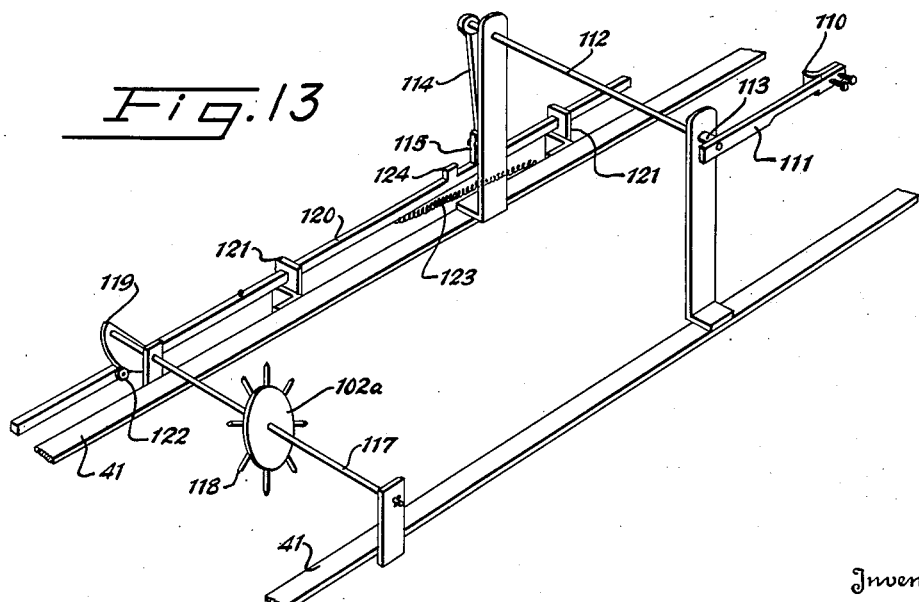

Figure 13 is a schematic view of means for timing tying of bales.

Similar reference numerals, in the several figures, indicate similar parts.

The baling machine embodying our invention is constructed in the form of a trailer to be towed by a farm tractor or other vehicle, and comprises a chassis of any suitable construction having supporting wheels. The baling machine is provided with a chamber into which hay to be baled is swept, and compressed by operation of a plunger. After sufficient hay has been compressed to form a bale of suitable size, the bale is automatically tied with twine or other suitable material. The machine is provided with twine carrying containers and twine knotting mechanism and reciprocating needles for advancing twine around the bales and into position to be knotted by the knotting mechanism.

Figure 1:
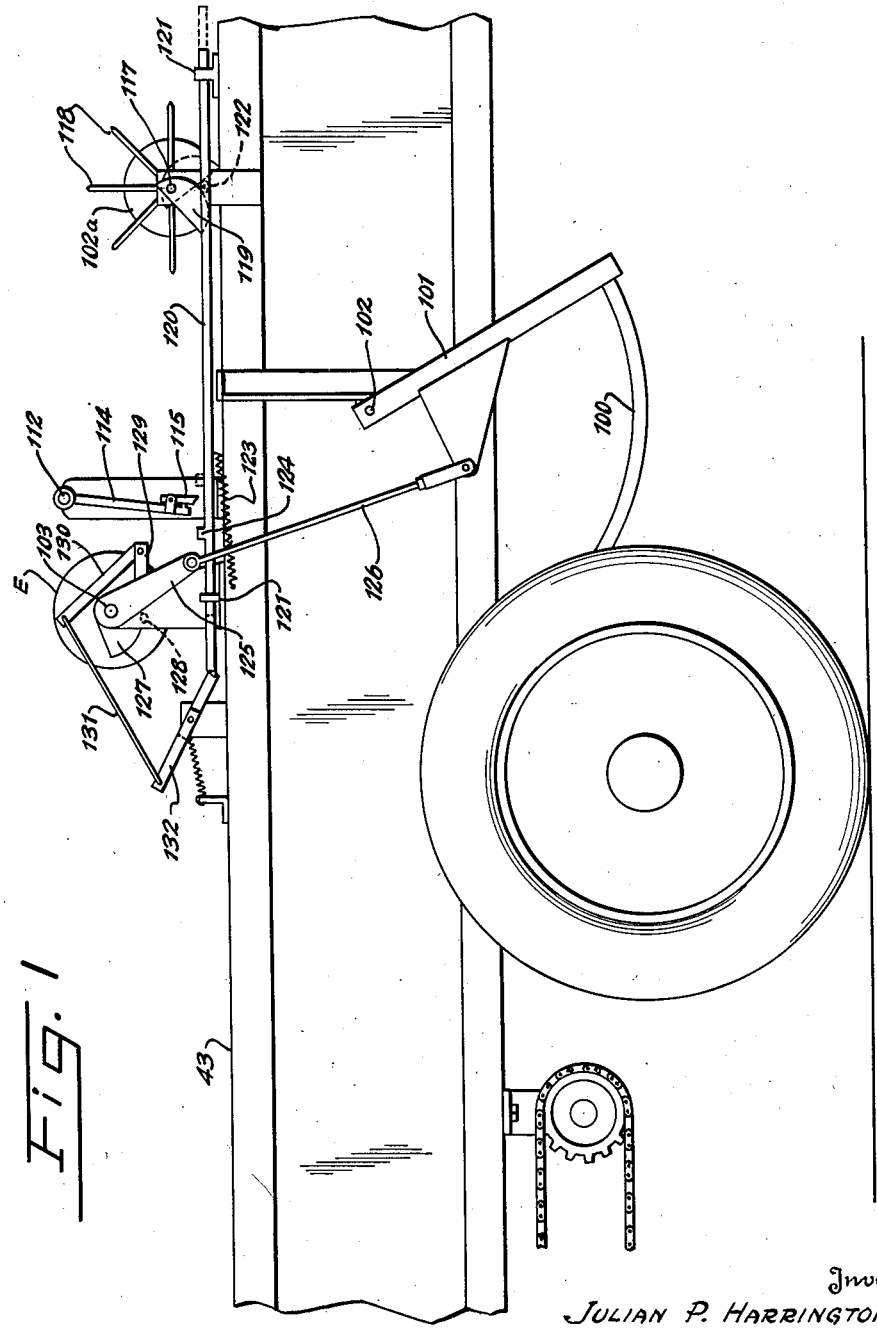
Figure 1 is an elevational view of a portion of a baling machine embodying our invention.

Figures 1 and 2 show a baling chamber which forms part of the baling machine. Hay is swept into an opening in the chamber, not shown, where it is compressed by plunger 50, which is operated by rod 51. Rod 51 is in turn connected to suitable operating mechanism. When the proper bale size is attained after a series of compressing operations by the plunger, twine from twine container 99 is moved upwardly around the bale by needles 100 into a knotting mechanism indicated by reference numeral E, and carried on the top of the baling machine. The twine is shown by Figures 6 and 7, and forms a loop around each bale. The needles are long and hollow to receive the twine. They are located beneath the baling chamber and carried on a swinging frame supported on each end of an arm 101 pivoted at 102 with the baling chamber.

The knotting mechanism is well known in the grain harvesting art, and several patents have been granted on such devices, such as those to Coler 604,022, Butterfield 628,071 and Innes 2,030,031. It is believed unnecessary to illustrate and describe the details of construction.

The needles move upwardly when the plunger or piston 50 has been retracted, as shown in Fig. 7. The operation of the needles and the knotting mechanism, are correlated by mechanism including a clutch which will be described hereinafter.

The length of a bale is measured off by a spiked wheel 102ª and the rotary movement imparted to it by the advancing bale coordinates the travel of the needles with the operation of the knotters and the movement of piston 50 through the instrumentalities which we will now describe.

The knotters E are actuated by the rotation of a shaft 103 through a clutch carrying the sprocket wheel 104 over which travels the chain 69. Chain 69 is driven by the sprocket 56ᵃ in unison with gear wheels 52—53 when the clutch mechanism is thrown into action or tripped by a trigger mechanism set into action by a measuring wheel. This clutch is shown in detail in Figs. 6-12. It embodies as one member a drum 104ᵃ freely revoluble on shaft 103. The drum is attached to sprocket wheel 104 and has a rim 105ᵃ provided with a notch 106 (Figs. 9-11). The other clutch member is a disc 104ᵇ having a hub 104ᶜ keyed to shaft 103, lying within the rim 105ᵃ, on which is pivoted a bell crank lever 107, the short arm thereof carrying a roller 108 which will fit into the notch 106, while the longer arm extends beyond the periphery of the disc. There is a tension spring 109 between the disc and the last mentioned arm which serves to move the lever in a direction to cause the roller 108 to lock the drum and disc together. When the last mentioned parts are disconnected the knotters are at rest holding tightly the ends of the twine and it is consequently necessary that the lever arm 107 be held inoperative against the tension of its spring 109. This is accomplished by a dog 110 on an arm 111 (Figs. 4-5), this arm being biased by a coil spring 111ᵃ shown in Figure 4. Dog 110 is secured to the arm by means of a pair of headed studs 110ᵃ biased in one direction by coil springs 110ᵇ, as seen in Figure 5.

The arm 111 lies above the clutch and is so mounted on shaft 112 that when the lever 107 and the arm 111 are in engagement the clutch mechanism is thrown out of action and the head 107ᵃ of the lever fits in the longitudinally extending notch 111ᵇ. The head lies against the vertical wall 111ᶜ in this position. When in this position the dog 110 is displaced away from the arm by the lever head 107ᵃ. (The dog is displaced in a direction that is downwardly as viewed in Figure 5.) The sprocket 104 is being driven constantly and as a result the notch 106 (see Figures 9-12) may have just passed the roller 108 when arm 111 is raised to release lever 107. Consequently one revolution of clutch member 104ᵃ will be made before the lever is rotated out from under the arm 111. The arm 111 which has been raised out of contact with lever 107 by rotation of shaft 112 will be released before the lever is moved out from under the arm whenever such a time pause exists between release of the lever and rotation thereof. The dog 110, however, will move back into the position shown in Figure 5 when the arm and lever become disengaged and when the arm drops down upon the lever before rotation thereof the dog will engage the head 107ᵃ and prevent said head from entering notch 111ᵇ. Thus the lever 107 cannot reenter notch 111ᵇ until the lever and its associated clutch member makes one revolution. When the lever is revolved it enters the notch and because of the curve of the dog see Figure 5, readily displaces the dog. The above described construction insures that the knotters will operate when desired.

There extends across the top of the baling chamber in front of the knotters E a rock shaft 112 from one end of which there extends an arm 113 by means of which the arm 111 is moved to raise the dog out of engagement with the bell crank arm 107. The other end of shaft 112 carries a trip arm 114 (Fig. 6) on the end of which is a pivoted latch 115 yieldingly held in operative position by a leaf spring 116. The mounting of the member 115 is such that it is free to move in one direction without swinging the arm 114 but will actuate said arm 114 when a projection 124 on a control slide 120 passes backwards beneath it when a bale reaches full size and is to be tied.

Located on the top of the machine is a transverse shaft 117 on which is located, at a mid point, the spiked wheel 102ᵃ. The wheel is provided with radial arms 118 the tips of which enter a slot in the top of the baling chamber and serve to revolve the shaft 117 as the baled material is compacted in and pushed along the chamber. The shaft 117 carries at one end a half moon shaped cam 119 (Fig. 1) which, it will be seen, makes one complete revolution for each completed bale, it being rotated as by engagement with the bale as it passes beneath the arms 118.

There is a reciprocating rod 120 supported in guides 121 on the side of the machine frame and at one side of the cam 119 having thereon a roller 122 which, upon engagement by the cam, displaces the rod lengthwise against the tension of a coil spring 123. Rod 120 is also provided on its upper side with a projection 124 so located that on the return movement of the rod it will engage the trip 115 resulting in oscillating shaft 112 and releasing the lever and the clutch 104ᵃ to throw the cord knotting mechanism into action. Since the successful operation of the knotting mechanism is dependent upon properly positioning the needles 100 we operate these by a crank 125 on shaft 103 which is connected by a pitman 126 with one of the arms 101 of the needle frame.

At the commencement of the baling operation the tying cords at their free ends are held firmly in the knotter and as more cord was required, by reason of the increasing size of the bale, this is frictionally drawn through the needles. Now upon completion of the bale the needles bring the twine around the end of the bale and position it to be looped, crossed and firmly tied to the first mentioned end of the twine. After the bale is firmly tied the ends of the twine are again grasped and held as the needles are retracted. At this instant there are lengths of twine extending from each knotter and as the needles recede it is essential that the bale be freed by severing the strands held by the knotters at the beginning of the baling operation. This we accomplish by the cutoffs forming part of the knotters and in order to time these cutters in accordance with the bale lengths I provide on the shaft 103 a cam 127 (Fig. 1) which engages a roller 128 to oscillate a lever 129. The latter is the first of a series of levers 130—131—132 linking the first mentioned lever with a shaft connected with twine cutters associated with the twine knotting mechanism. The cutting mechanism does not form a part of this invention and is not described.

We claim:

1. In a baling apparatus having a rotatable shaft, a clutch comprising cooperative fast and loose elements on said shaft, coacting means on said elements including a lever fulcrumed on said fast element by which said loose element is drivingly connected with said fast element or disconnected therefrom upon movement of the lever in one direction to drivingly connect and in the opposite direction to disconnect said elements, resilient means connected with the fast element and the lever which urges the lever in one direction to drivingly connect the elements, means movable into engagement with the lever, said movable means comprising an oscillatory arm having a projecting contact member resiliently held against the arm, said member being movable by the oscillation of the arm into engagement with the lever to disengage said coacting means and out of engagement with the lever to engage said coacting means.

2. In a baling apparatus having a rotatable shaft, a clutch comprising cooperative fast and loose elements on said shaft, coacting means on said elements including a lever fulcrumed on said fast element by which said loose element is drivingly connected with said fast element or disconnected therefrom upon movement of the lever in one direction to drivingly connect and in the opposite direction to disconnect said elements, resilient means connected with the fast element and the lever which urges the lever in one direction to drivingly connect the elements, means movable into engagement with the lever, said movable means comprising an oscillatory arm having a projecting contact member resiliently held against the arm, said member being movable by the oscillation of the arm into engagement with the lever to disengage said coacting means and out of engagement with the lever to engage said coacting means, the lever engaging portion of said contact member being flared away from the surface of the arm to form a lever receiving opening between the member and said arm, and means on said loose element of constantly rotating it.

3. In a baling apparatus, a rotatable shaft, a clutch comprising a lever fulcrumed on said clutch, means movable into engagement with the lever, said movable means comprising an oscillatory arm having a contact member connected to one end thereof by elongated studs, springs mounted on the studs whereby said member is resiliently urged against one face of the arm, said member being movable by the oscillation of the arm into engagement with the lever and out of engagement with the lever, the lever engaging portion of said contact member being flared away from the surface of the arm to form a lever receiving opening between the member and said arm.

4. In a baling apparatus, the combination of a driven shaft, a clutch comprising a member fixed to said shaft, another member rotatable with respect thereto and a means for interconnecting and disconnecting said members, comprising a lever mounted on said clutch, and an arm movable into engagement with said lever so as to cause said aforesaid means to disconnect said members, said arm having a contact member resiliently connected thereto, a driven second shaft, said arm being mounted on said second shaft and movable into said engagement by said second shaft, said contact member and said arm cooperating with said lever and said arm so as to insure engagement therebetween.

5. In a baling apparatus, a rotatable shaft, a clutch for driving said shaft having a lever pivotally mounted thereon, a second shaft having an arm mounted thereon, said arm having a notch formed therein, said lever being rotatably mounted with respect to said arm, said arm being movable by said second shaft so as to engage said lever, said notch in said arm cooperating with said lever when said arm is in engagement therewith so as to cause said lever to pivot about its mounting on said clutch and so as to interrupt the driving connections between said clutch and said first mentioned shaft, a dog mounted on said arm, resilient means urging said dog into engagement with said lever along a side thereof, said resilient means urging said dog against said arm when said arm disengages from said lever, said dog being interposed between said lever and said arm when said arm and dog become disengaged from said lever.

6. In a baling apparatus, a rotatable shaft, a clutch, said clutch comprising an operating lever, said lever being rotatable with said shaft when said clutch is engaged, a second shaft, an arm mounted thereon said arm being rotatable into a position in which it will engage said lever when said lever is in a corresponding position, said arm having a longitudinally extending notch formed therein, said lever entering said notch upon rotation of said lever when said arm lies in the above first mentioned position and engaging said arm, said lever being pivotally mounted and being pivoted about its mounting upon engagement with said arms and rotation of said lever, a dog, means resiliently mounting said dog on said arm, said dog being displaced by said lever when said lever and arm are in engagement, said arm being rotatable out of engagement with said lever, said dog being moved by said resilient mounting means into a position in which it lies substantially parallel to said arm and in which it is coextensive with a portion of said notch, said dog when in the last mentioned position lying between said arm and said lever so as to prevent engagement therebetween until said dog is displaced.

7. In a baling apparatus, a clutch, a clutch operating lever pivotally mounted thereon, an arm rotatably mounted, said arm being rotatable into and out of a position of engagement with said lever, said lever being rotatable with said clutch when said arm is out of engagement therewith, said arm having a longitudinally extending notch formed thereon, a dog, resilient means urging said dog to a position against said arm, said dog when in said position lying parallel to said arm and being partially coextensive with said notch, said dog being displaced by said lever when said lever and arm are in engagement, said dog being moved back to said last mentioned position by said resilient means upon rotation of said arm out of engagement with said lever, and lying between said arm and said lever, means moving said arm back into said first mentioned position of engagement upon rotation of said lever with said clutch out of the said first mentioned position of engagement, said lever being so disposed as to enter said guideway, displace said dog and engage said arm upon further rotation of said lever with said clutch.

8. In a baling apparatus having a rotatable shaft, a clutch drivingly connected to said shaft and having driving and driven elements adapted to be drivingly engaged, a lever fulcrumed on said clutch, means movable into engagement with the lever, said movable means comprising an oscillatory arm having a contact member connected to one end thereof by elongated studs, springs mounted on the studs whereby said member is resiliently urged against one face of the arm, said member being movable by the oscillation of the arm into engagement with the lever to drivingly disengage said elements, and out of engagement with the lever to drivingly engage said elements.

JULIAN PICOTT HARRINGTON.
JOHN D. MITCHELL.

(References on following page)

References Cited in the file of this patent

UNITED STATES PATENTS

| Number | Name | Date |
|---|---|---|
| 866,750 | Vincent | Sept. 24, 1907 |
| 925,957 | Sharp | June 22, 1909 |
| 1,369,612 | Bowers | Feb. 22, 1921 |
| 1,822,955 | Card | Sept. 15, 1931 |
| 2,014,234 | Klocke | Sept. 10, 1935 |
| 2,030,031 | Innes | Feb. 4, 1936 |
| 2,236,628 | Nolt | Apr. 1, 1941 |
| 2,326,611 | Bossmeyer et al. | Aug. 10, 1943 |
| 2,400,555 | Johnston | May 21, 1946 |
| 2,405,688 | Crumb | Aug. 13, 1946 |
| 2,487,938 | Nikkel | Nov. 15, 1949 |
| 2,489,199 | Russell | Nov. 22, 1949 |
| 2,498,319 | Vutz et al. | Feb. 21, 1950 |
| 2,546,324 | Tuft et al. | Mar. 27, 1951 |

FOREIGN PATENTS

| Number | Country | Date |
|---|---|---|
| 270,587 | Germany | Feb. 19, 1914 |
| 705,457 | Germany | Apr. 29, 1941 |